United States Patent [19]

Peter et al.

[11] Patent Number: 5,356,539
[45] Date of Patent: Oct. 18, 1994

[54] TANDEM WASTE STREAM TREATMENT FOR THE REMOVAL OF NITROAROMATICS AND NITROPHENOLICS

[75] Inventors: Steven B. Peter, Kutztown; Keith B. Adams, Coopersburg; Baldomero Casas, Emmaus; John E. Sawicki, Breinigsville, all of Pa.

[73] Assignee: Air Products and Chemicals, Inc., Allentown, Pa.

[21] Appl. No.: 33,597

[22] Filed: Mar. 19, 1993

[51] Int. Cl.⁵ .......................... C02F 1/28; C02F 1/72
[52] U.S. Cl. ................................... 210/668; 210/669; 210/759; 210/909
[58] Field of Search ............... 210/759, 908, 909, 668, 210/669

[56] References Cited

U.S. PATENT DOCUMENTS

| | | | |
|---|---|---|---|
| 2,070,856 | 2/1937 | Butterfield | 210/668 |
| 4,294,703 | 10/1981 | Wilms et al. | 210/759 |
| 4,340,490 | 7/1982 | Junkermann et al. | 210/909 |
| 4,370,241 | 1/1983 | Junkermann et al. | 210/909 |
| 4,604,214 | 8/1986 | Carr et al. | 210/759 |
| 4,767,543 | 8/1988 | Chornet et al. | 210/909 |
| 4,804,480 | 2/1989 | Jayawant | 210/759 |
| 4,925,565 | 5/1990 | Adams et al. | 210/634 |
| 5,039,416 | 8/1991 | Loew et al. | 210/759 |

*Primary Examiner*—Cynthia L. Nessler
*Attorney, Agent, or Firm*—Michael Leach; James C. Simmons; William F. Marsh

[57] ABSTRACT

A process for removing nitroaromatic and nitrophenolic compounds from an alkaline wastewater stream generated in a process for the nitration of aromatic compounds by the mixed acid technique, which comprises (a) adjusting the pH of the aqueous alkaline waste stream containing nitroaromatic and nitrophenolic compounds to a range from about 2 to 4.5, (b) contacting the acidic aqueous stream with sufficient hydrogen peroxide and ferrous ion under conditions to effect oxidation of the nitrophenolic compounds, (c) adjusting the acidic, oxidized aqueous waste stream having a reduced nitrophenolic content to about pH $\geq 4$, and (d) contacting the aqueous waste stream with a carbon adsorbent.

20 Claims, No Drawings

TANDEM WASTE STREAM TREATMENT FOR THE REMOVAL OF NITROAROMATICS AND NITROPHENOLICS

FIELD OF THE INVENTION

The present invention relates to a process for removing nitro-aromatic and nitrophenolic compounds from an aqueous waste stream.

BACKGROUND OF THE INVENTION

Production of nitroaromatic compounds from the mixed acid nitration of benzene or toluene is accompanied by the production of nitrophenolic by-products. It is common industrial practice to remove these nitrophenolic by-products from the nitroaromatic hydrocarbon reaction product by an aqueous alkaline washing step. This alkaline aqueous waste stream containing the nitrophenolic by-products is also saturated with nitroaromatic hydrocarbons.

Reduction of the concentration of priority pollutant nitrophenolics and nitroaromatic hydrocarbons to less than one part per million (sub-ppm) in aqueous waste streams discharged to the environment is a very recent requirement in most industrialized nations. The specific priority pollutants addressed are 2-nitrophenol, 4-nitrophenol, 4,6-dinitro-o-cresol, 2,4-dinitrophenol, 2,6-dinitrotoluene, 2,4-dinitrotoluene and nitrobenzene.

U.S. Pat. No. 4,604,214 discloses a process for removing trinitrocresols and picric acid contaminants from a wastewater stream generated in the production of nitroaromatics. The process involves contacting the crude dinitrotoluene generated by the mixed acid technique with an alkaline medium to generate an alkaline wash water containing water soluble nitrocresols and picric acid. The wash water is treated with aqueous acid in sufficient amounts to reduce the pH to 3-4. After pH adjustment the aqueous medium is contacted with hydrogen peroxide and a ferrous ion under conditions to effect oxidation of a substantial portion of the trinitrocresol to carboxylic acid, nitric acid and carbon dioxide.

U.S. Pat. No. 4,804,480 discloses a process for destroying polynitrophenols or their salts in an aqueous waste by treating with at least 2 moles of hydrogen peroxide per mole of polynitrophenol in the presence of from 0.002 to 0.7 moles of an iron salt per mole of polynitrophenol. The destruction takes place at a pH lower than 4 and a temperature greater than 65° C.

U.S. Pat. No. 4,925,565 discloses a process for the reprocessing of nitrophenolic by-products, which are contained in the wastewater from a nitration, through solvent extraction, distillative recovery of the solvent and recovery of a nitrophenolic residue and incineration of the nitrophenolic residue.

Incineration or wet air oxidation are processes which are not economically viable for aqueous streams that are relatively low in organic content (about 1 wt %). Most other treatment methods involve chemical reaction, e.g. ozonolysis or Fenton's reagent (hydrogen peroxide and ferrous ion). The chemical reaction rate drops precipitously as the concentration of the priority pollutant begins to approach the low levels required. In order to achieve the low, allowable concentrations of priority pollutants, large excesses of the chemical reactant must be added.

For example, the oxidative destruction of the bulk of the nitrophenols with Fenton's reagent is cost effective when the target range is 10-100 ppm. The oxidation of the nitroaromatic hydrocarbons is, however, much less efficient. Efforts to achieve sub-ppm concentrations on all priority pollutant nitrobodies present using Fenton's reagent alone requires so much hydrogen peroxide that other stand-alone treatments such as carbon treatment are more cost effective.

Thus, carbon adsorption is the most obvious treatment technology; however, as a stand alone technology it suffers certain drawbacks. One such drawback is the volume of carbon required to treat an industrial alkaline waste stream containing both nitroaromatics and nitrophenols. Carbon treatment alone allows for a certain loading of the nitrobody species to be adsorbed on the carbon bed before the nitrophenols are displaced from the carbon by the nitroaromatic hydrocarbons (the chromatographic effect), i.e. the nitrophenolics are less strongly adsorbed.

Since the regulated nitroaromatic hydrocarbons displace the nitrophenols, only four of which are presently regulated, from the carbon bed, an obvious approach is to remove the nitroaromatic hydrocarbons from the alkaline waste stream before passing it through the carbon bed. Such pretreatment removal of the nitroaromatics would involve biodegradation of the waste stream with suitable microorganisms or precipitation of the nitroaromatic hydrocarbon by chilling the waste stream.

SUMMARY OF THE INVENTION

In contrast to pretreating the waste stream to remove the nitroaromatic hydrocarbons, the present invention pretreats the waste stream to remove the nitrophenolics. Thus the present invention is a process for efficiently removing nitroaromatics and nitrophenolics from an aqueous waste stream from aromatic hydrocarbon nitration processes by the tandem treatment of the waste stream with ferrous ion and hydrogen peroxide oxidation at a pH below about 4.5 to oxidize the nitrophenolics followed by carbon adsorption.

Such tandem treatment of the aqueous waste stream achieves essentially complete removal of nitroaromatic pollutants at a cost far below that achieved when either technology alone is applied. The process efficiently removes nitroaromatics at very high organic loading per unit volume of carbon, i.e. treatment of more wastewater per unit volume of carbon.

When the nitrophenolic content of the aqueous waste stream to be passed through the carbon bed is reduced, a surprisingly larger nitroaromatic hydrocarbon loading is achieved on the carbon bed before any nitrophenols are displaced from the bed. The degree of increase in the carbon capacity for nitroaromatic hydrocarbons after oxidation of the nitrophenolics is quite unexpected.

For example, in a dinitrotoluene (DNT) plant process the total organic carbon content of the alkaline aqueous waste stream may be reduced by 10 to 15% as a result of the oxidation process oxidizing a substantial portion of the nitrophenolics to carboxylic acid, nitric acid and carbon dioxide. However, the carbon capacity for the nitroaromatic hydrocarbons from the combined oxidized waste stream and other DNT saturated acidic waste streams not containing nitrophenolics is at least doubled and can be increased as much as 3-5 times. Thus, treatment of the raw waste stream with ferrous ion and sufficient hydrogen peroxide (Fenton's reagent) to oxidize a substantial portion of the nitrophenolics prior to carbon treatment is then particularly attractive as Fenton's reagent can very economically reduce the nitrophenolics concentration to the point where carbon treatment of the oxidized stream then becomes very efficient.

A particular embodiment of the present invention provides an improved process for removing nitroaromatic and nitrophenolic compounds from an alkaline wastewater stream generated in a process for the nitration of aromatic compounds by the mixed acid technique. The process comprises (a) adjusting the pH of the aqueous alkaline waste stream containing nitroaromatic and nitrophenolic compounds to a range from about 2 to 4.5, (b) contacting the acidic aqueous stream with sufficient hydrogen peroxide and ferrous ion under conditions to effect oxidation of a substantial portion of the nitrophenolic compounds, (c) adjusting the acidic, oxidized aqueous waste stream having a reduced nitrophenolic content to about pH $\geq 4$, and (d) contacting the aqueous waste stream with a carbon adsorbent.

DETAILED DESCRIPTION OF THE INVENTION

In the commercial manufacture of nitroaromatics an aromatic compound such as benzene or toluene is nitrated in a liquid phase reaction using a mixture of concentrated nitric acid and sulfuric acid. In the production of nitroaromatics, e.g. mononitrobenzene, mononitrotoluene, dinitrobenzene and dinitrotoluene, by-product nitrophenolic materials are produced. Such nitrophenolic material usually includes nitrophenols, nitrocresols, either dinitro- or trinitrocresol, and picric acid. These are referred to as oxidative by-products and are the result of side reactions. These by-products must be removed from the crude nitration reaction product without creating an environmentally unacceptable aqueous waste stream. Removal of these by-product materials from the aromatic product is necessary as many believe the presence of nitrophenolic materials interferes with the catalyst in subsequent reduction of the nitro group.

In nitration processes the reaction product is removed from the nitration reactors and passed to a separator where the organic phase is separated from the aqueous phase. The crude nitroaromatic composition is then contacted with a dilute aqueous alkaline-containing solution to convert the nitrophenolics to water soluble salts thereby generating an organic phase and an aqueous alkaline phase which contains the salts of the nitrophenolics and other oxidative by-products. Alkaline materials suited for converting the nitrophenolic material to the water soluble salts include sodium carbonate, ammonium hydroxide, sodium hydroxide, sodium bicarbonate, potassium hydroxide and other like alkaline materials. Aqueous solution concentrations of the alkaline material are generally from about 1–10 wt%.

Contacting of the crude nitroaromatic product with the aqueous alkaline solution is performed at a temperature from about 25° to 80° C. and a pressure from about 1–5 atm. Normally this contacting is done at about 70° C. and atmospheric pressure (1 atm) as it appears to be the most convenient way of converting the nitrophenolic materials to water soluble salts. However, neither temperature nor pressure is critical to this contacting step.

Once the crude nitroaromatic product has been treated with aqueous alkaline material, an organic layer and an aqueous layer are formed. The aqueous layer is separated from the organic layer by decanting leaving a top aqueous layer containing water soluble salts of nitrophenolic material, e.g. water soluble salts of nitrophenols, dinitrophenols, dinitrocresols, trinitrophenols and trinitrocresols. The alkaline aqueous phase also becomes saturated with mononitro- and dinitroaromatic hydrocarbons, such as nitrobenzene and 2,4- and 2,6-dinitrotoluenes. To maximize the effectiveness of the alkaline treatment, the aqueous alkaline medium, after separation from the treated organic phase, is often recycled for contact with additional quantities of crude nitroaromatic product to enhance or increase the concentration of the water soluble salts in the aqueous phase and decrease the amount of unreacted alkaline material. Of significant importance, this recycling of the alkaline aqueous phase also reduces the saturated nitroaromatic losses in the aqueous phase because of the "salting out" effect of the increased amount of dissolved nitrophenolic salts. Generally, the aqueous alkaline phase obtained on separation from the organic layer is recycled until the concentration of alkali metal salts ranges from about 0.1 to 1.5 wt%, usually 0.3 to 1.2 wt%.

When the concentration of water soluble nitrophenolic salts in the aqueous medium reaches the desired concentration, at least a portion of the aqueous phase is separated for further treatment with an acid under conditions sufficient to reduce the pH of the aqueous phase to below about 4.5 for contacting with the oxidizing agent, preferably about pH 2–4. This pH reduction can be accomplished by the addition of an inorganic acid such as nitric acid or sulfuric acid since both of these acids are available as spent acids from the nitration process; however, any inorganic acid will suffice. Addition of the acid is accomplished at temperatures from about 25° to 80° C. and pressures from 1–5 atm, typically 25°–30° C. and atmospheric pressure. Although some oxidation of phenolic materials can be effected at a pH as high as 5, trinitrocresols do not oxidize under such conditions.

In most nitroaromatic alkaline wash waters, the soluble nitrophenolic salts are of such high concentration that if the pH reduction is performed prior to reaction with Fenton's reagent, much nitrophenolic material will precipitate. Therefore, such pH adjustment should be performed concomitantly with the addition of hydrogen peroxide in the oxidation reactor and is specifically contemplated as the preferred embodiment in the inventive process.

Accordingly, alkaline wash water normally is left at high pH (7–10) and fed continuously to the reactor along with Fenton's reagent and the reactor pH is maintained at 3. Sometimes this even requires the addition of caustic because of the amount of nitric and organic acids generated during the oxidation. Continuous oxidation is preferred since a constant pH may be maintained leading to optimum oxidation rates and optimum usage of the oxidizing agent. This occurs at about pH 3.

To effect oxidation, Fenton's reagent comprising hydrogen peroxide and a ferrous iron source is added to the wastewater. At elevated temperatures, for example, from 70°–90° C., the trinitrocresols and trinitrophenols in particular are oxidized to nitric acid, carbon dioxide and carboxylic acid within a reaction time of about 30 minutes to one hour. In general, suitable temperatures for effecting the oxidation of the nitrophenolics would range from 40° to 100° C., preferably 60° to 90° C., suitable pressures would range from 0.5 to 5 atm, preferably 1 to 2 atm, and suitable times would range from 0.5 to 1.5 hr.

The process uses hydrogen peroxide, obtained from any commercial source in any concentration, in an amount sufficient to effect oxidation of a substantial portion of the nitrophenolics such as, for example, at least 5 moles of hydrogen peroxide per mole of nitrophenolics. There is no upper limit to the amount of hydrogen peroxide, but about 25 moles hydrogen peroxide per mole of nitrophenolics is probably the upper limit of a cost-effective use of this oxidizing agent. Preferred limits are 8 to 20 moles and most preferred limits are 10 to 15 moles of hydrogen peroxide per mole of nitrophenolics.

Any chemical that will generate hydrogen peroxide in the reaction mixture would be acceptable for nitrophenolics destruction by this process.

The ferrous ion used to catalyze the oxidization of the nitrophenolic material is provided by any aqueous soluble ferrous salt, most typically ferrous sulfate or ferrous ammonium sulfate. The amount of ferrous ion needed is about 0.15 to 1 moles per mole of nitrophenolics, preferably 0.25 to 0.75 moles ferrous ion per mole nitrophenolics.

Additional teaching with regard to the use of hydrogen peroxide and iron ion to remove nitrophenolic material from waste streams can be garnered from U.S. Pat. No. 4,604,214 and 4,804,480, which disclosures are hereby incorporated by reference.

The now acidic, oxidized aqueous waste stream is adjusted to pH $\geq 4$, if necessary, and passed through or contacted with a bed of carbon, preferably activated charcoal, to remove essentially all the remaining unoxidized nitrophenolics and all the nitroaromatic hydrocarbons in the aqueous stream. The amount of such carbon composing the bed should be about 1 to 4 kg carbon/kg nitroaromatics in the waste stream. This contacting of the waste stream with the carbon bed may suitably be performed at temperatures ranging from 25° to 90° C., preferably 25 to 50° C., pressures ranging from 1 to 5 atm, preferably 1 to 2 atm.

The invention provides for an unexpected increase in the capacity of the carbon to adsorb nitroaromatic hydrocarbons. This carbon capacity can be measure in two ways: (1) by the amount of organic material adsorbed on the carbon (wt/wt basis) and (2) by the volume of wastewater treated with a fixed quantity of carbon (vol/wt basis). When considering the impacts on the regeneration of activated carbon, typically the organic loading is the parameter of interest. When relating carbon performance from a wastewater treatment, operational standpoint, the volume treated by a given unit of carbon is considered. The two measurements are related in the following manner:

At a given concentration, a volume of wastewater contains a fixed mass of organic components. If, for example, 5 grams of carbon can satisfactorily treat (meet discharge limits) one liter of wastewater containing 1000 mg organics/liter, the carbon has adsorbed 1 gram of organics on 5 grams of carbon, or a loading of 0.2 g organics/g carbon. If, after a pretreatment step which selectively removes 10% of the organics in the wastewater, the same 5 grams of carbon can satisfactorily treat 2 liters of the wastewater now containing 900 mg organics/liter, the carbon has adsorbed 1.8 grams of organics on 5 grams of carbon, or a loading of 0.36 g organics/g carbon, an 80% increase in carbon capacity from a 10% decrease in wastewater organics. The ability to treat increased quantities of organics present in the increased volume of wastewater results in a higher loading of organic compounds on the carbon adsorbent.

In the following examples the tables make a simplifying assumption that all total organic carbon (TOC) is adsorbed.

EXAMPLE 1

Into a 375 ml glass stirred tank reactor was charged mononitrobenzene (MNB) alkaline wash water obtained on treatment of the reaction product from a nitrobenzene plant. The vessel contents were agitated by two stainless steel impellers and the vessel raised to 65° C. by means of passing hot water through the vessel jacket. Four feed pumps were then activated with the composition of each of the feeds to the vessel and the rates as follows:

MNB alkaline wash water containing soluble salts of the nitrophenols—13.0 g/min. A solution of 5 wt% aqueous ferrous sulfate heptahydrate—0.24 g/min. Aqueous hydrogen peroxide—10 wt% at 0.49 g/min, the weight ratio of $H_2O_2$/ nitrophenols equaled 1.17:1.

A 2% aqueous sodium hydroxide solution—0.25 g/min (as controlled by a pH controller set at pH—3.0).

Following the achievement of steady state in the reactor, the reactor effluent was collected and submitted to carbon adsorption studies. Samples were removed for analysis for nitrobenzene by gas chromatography and for nitrophenols by high performance liquid chromatography (HPLC). The results of these analyses are shown in Table 1.

TABLE 1

REMOVAL OF ORGANICS IN MONONITROBENZENE ALKALINE WASH WATER WITH FENTON'S REAGENT

| Compound | Concentration (ppm) | | % Removal |
|---|---|---|---|
| | Raw Alkaline Wash Water | Reactor Effluent | |
| Nitrobenzene | 288 | 97 | 66 |
| 2,4-Dinitrophenol | 2249 | 339 | 85 |
| Picric acid | 976 | 109 | 89 |
| Total Organic Carbon* | 1320 | 1199 | 9 |

*Total Organic Carbon (TOC) - measurement of the amount of carbon in all the organic materials. Because of the nitrogen and oxygen atoms in a nitrophenol, for example, the amount of organic carbon in the molecule is significantly less than 100%. This leads to data in which ppm of nitrophenols is greater than ppm of TOC.

Example 2

In a fashion similar to that of Example 1, mononitrotoluene (MNT) alkaline wash water obtained on treatment of the reaction product of toluene nitration was submitted to Fenton's reagent pretreatment. The composition of each of the feeds and their feed rates were as follows:

MNT alkaline wash water containing soluble salts of nitrophenols and dinitrocresols—13.1 g/min.

A solution of 5 wt% aqueous ferrous sulfate heptahydrate—0.18 g/min.

Aqueous hydrogen peroxide—10 wt% at 0.36 g/min, the weight ratio of $H_2O_2$/ nitrophenols and dinitrocresols equaled 2.40:1.

A 5% aqueous sulfuric acid solution—0.60 g/min (as controlled by pH controller set at 2.7).

TABLE 2
REMOVAL OF ORGANICS IN MONONITROTOLUENE ALKALINE WASH WATER WITH FENTON'S REAGENT

| Compound | Concentration (ppm) | | % Removal |
| --- | --- | --- | --- |
| | Raw Alkaline Wash Water | Peroxide Treated | |
| Mononitrotoluenes | 323 | 23.7 | 71 |
| Dinitro-o-cresol | 82.8 | 14.4 | 83 |
| Dinitro-p-cresol | 980 | 166 | 83 |
| Total Organic Carbon | 772 | 791 | ~0* |

*Different starting samples had differing initial concentrations of nitrophenolic contaminants - an artifact of laboratory procedures.

Example 3

MNB alkaline wash water was pumped through a 19.1 cm×1.27 cm (7.5"×0.5") stainless steel tube packed with 24 g of granular activated carbon. Samples from the carbon bed effluent were drawn every 15 minutes for analyses. The results of these analyses are shown in Table 3 for both the raw MNB alkaline wash water and the hydrogen peroxide treated MNB alkaline wash water of Example 1. "Breakthrough" is the concentration at which the individual pollutant exceeded 0.5 ppm.

TABLE 3
ACTIVATED CARBON TREATMENT OF MNB ALKALINE WASH WATER

| Compound | Volume Treated Prior to Breakthrough (ml) | | % Improvement |
| --- | --- | --- | --- |
| | Raw | $H_2O_2$ Treated | |
| nitrobenzene | 750 | 1200 | 60 |
| 2-nitrophenol | 600 | 2100 | 250 |
| 4-nitrophenol | 1500 | 1800 | 20 |
| 2,4-dinitrophenol | 450 | 1650 | 270 |
| picric acid | 450 | 750 | 70 |
| grams organics removed/5 g carbon* | 0.59 | 1.84 | 210 |

*Based on minimum volumes treated of regulated compounds exceeding "breakthrough" quantity. For 2,4-dinitrophenol - 450 ml for untreated and 1650 ml for treated. Picric acid is not presently regulated.

In Example 1 peroxide treatment reduced the organic content from 1320 mg TOC/liter to 1199 mg TOC/liter, a reduction of approximately 9% Table 3 shows the resulting increase in the volume of wastewater which could be treated by a 5 gram carbon bed was 270% (1650 ml vs 450 ml based on least volume for regulated chemical species.) Accounting for the decreased organic content following oxidation pretreatment, the net increase in organic load treated by the 5 gram carbon bed was 230%.

EXAMPLE 4

In a manner identical to Example 3, raw MNT alkaline wash water was submitted to activated carbon treatment along with the hydrogen peroxide treated MNT alkaline wash water of Example 2. The analytical results of this example are displayed in Table 4. "Breakthrough" is the concentration at which the individual pollutant exceeded 0.5 ppm.

TABLE 4
ACTIVATED CARBON TREATMENT OF MNT ALKALINE WASH WATER

| Compound | Volume Treated Prior to Breakthrough (ml) | | % Improvement |
| --- | --- | --- | --- |
| | Raw | $H_2O_2$ Treated | |
| mononitrotoluenes | 1350 | >3300 | >145 |
| 4,6-dinitro-o-cresol | 1800 | >3300 | >85 |
| 2,6-dinitro-p-cresol | 1050 | 2550 | 140 |
| grams organics removed/5 g carbon* | 0.81 | 2.02 | 150 |

*Based on minimum volumes treated of regulated compounds exceeding "breakthrough" quantity. For 4,6-dinitro-o-cresol - 1800 ml for untreated and >3300 ml for treated. 2,6-Dinitro-p-cresol is not presently regulated.

EXAMPLE 5

To 315 g of dinitrotoluene (DNT) alkaline wash water, $5.37 \times 10^{-3}$m in ferrous ammonium sulfate at 70° C. was added 12.2 g of 30% of hydrogen peroxide (weight ratio of hydrogen peroxide to total organic carbon=8.06:1) with stirring. The pH was maintained at 3.4–3.5 by the continuous addition of 8 g of 2N sodium hydroxide. The analytical results of this Example are shown in Table 5 and the material from this Example was used in Example 6.

TABLE 5
REMOVAL OF ORGANICS IN DNT ALKALINE WASH WATER WITH FENTON'S REAGENT

| Compound | Concentration (ppm) | | % Removal |
| --- | --- | --- | --- |
| | Raw Alkaline Wash Water | Peroxide Treated Alkaline Wash Water | |
| 2,4-dinitrotoluene | 425 | 227 | 35 |
| 2,4-dinitrophenol | 1.41 | ND | 100 |
| 4,6-dinitro-o-cresol | 8.01 | 0.268 | 97 |
| 4-nitrophenol | 2.62 | 0.258 | 90 |
| 2-nitrophenol | 3.48 | 3.69 | −6* |
| Total Organic Carbon | 1440 | 1151 | 20 |

*Data indicates formation of compound, attributable to breakdown of other nitrophenolic species or the limit of analytical accuracy.

EXAMPLE 6

In a manner identical to Example 3, the raw DNT alkaline wash water and the hydrogen peroxide treated DNT alkaline wash water of Example 5 which had been pH adjusted to 4.0 were submitted to activated carbon treatment. The analytical results of this example are displayed in Table 6.

TABLE 6
ACTIVATED CARBON TREATMENT OF DNT ALKALINE WASH WATER

| Compound | Volume Treated Prior to Breakthrough (ml) | | % Improvement |
| --- | --- | --- | --- |
| | Raw | $H_2O_2$ Treated | |
| 2,4-DNT | 2910 | 3841 | 32 |
| 2,4-dinitrophenol | 3259 | >4540 | 40 |
| 4,6-dinitro-o-cresol | 2910 | >4540 | 60 |
| 4-nitrophenol | 2794 | >4540 | 60 |
| 2-nitrophenol | 2910 | >4540 | 60 |
| grams organics removed/5 g carbon* | 4.0 | >5.20 | >31 |

*Based on minimum volumes treated of regulated compounds exceeding "breakthrough" quantity. For 4-nitrophenol - 2794 ml for untreated and >4540 ml for treated. 2,4-Dinitrotoluene is not presently regulated.

Peroxide treatment reduced the organic content from 1440 mg TOC/liter to 1151 mg TOC/liter, a reduction of approximately 204%. The resulting increase in the volume of wastewater which could be treated by a 5 gram carbon bed was >60% (>4540 ml vs 2794 ml based on least volume for regulated chemical species.) Accounting for the decreased organic content following oxidation pretreatment, the net increase in organic load treated by the 5 gram carbon bed was 304%.

STATEMENT OF INDUSTRIAL APPLICATION

The present invention provides a method for essentially complete removal of nitrophenolic and nitroaromatic materials from an aqueous waste stream without discharging an environmentally unacceptable aqueous stream.

We claim:

1. A process for removing nitrophenolics and other nitroaromatic from an aqueous waste stream from an aromatic hydrocarbon nitration process which comprises oxidizing substantially all of the nitrophenolics in the waste stream with ferrous ion catalyst and hydrogen peroxide at a pH below about 4.5 and thereafter contacting the oxidized waste stream with a carbon adsorbant wherein essentially all of the remaining unoxidized nitrophenolics and all other nitroaromatics in the aqueous waste stream are removed in said contacting step.

2. The process of claim 1 in which the oxidizing occurs at pH ranging from 2-4.5.

3. The process of claim 1 in which the oxidized waste stream is adjusted to about pH $\geq 4$ prior to contacting with the carbon adsorbant.

4. The process of claim 1 in which at least 5 moles hydrogen peroxide are added per mole nitrophenolics.

5. The process of claim 1 in which about 0.15 to 1 moles ferrous ion are used as a catalyst per mole nitrophenolics.

6. The process of claim 1 in which the carbon adsorbant is activated charcoal.

7. The process of claim 1 in which 1-4 kg carbon adsorbant is used per kg nitroaromatics in the waste stream.

8. The process of claim 1 in which the aromatic hydrocarbon is benzene.

9. The process of claim 1 in which the aromatic hydrocarbon is toluene.

10. In a process for removing nitrophenolic and other nitroaroma compounds from an aqueous alkaline waste stream generated in a process for the nitration of aromatic compounds by the mixed acid technique, the improvement which comprises
    (a) adjusting the pH of the aqueous alkaline waste stream containing nitroaromatic and nitrophenolic compounds to a range from about 2 to 4.5,
    (b) contacting the acidic aqueous stream with sufficient hydrogen peroxide and ferrous ion catalyst under conditions to effect oxidation of a substantial portion of the nitrophenolic compounds,
    (c) adjusting the acidic, oxidized aqueous waste stream having a reduced nitrophenolic content to about pH $\geq 4$, and
    (d) thereafter contacting the aqueous waste stream with a carbon adsorbent, wherein essentially all of the remaining unoxidized nitrophenolics and all other nitroaromatics in the aqueous waste stream are removed in said contacting step.

11. The process of claim 10 in which 8-20 moles hydrogen peroxide are added per mole nitrophenolics.

12. The process of claim 10 in which about 0.15 to 1 moles ferrous ion are used as a catalyst per mole nitrophenolics.

13. The process of claim 10 in which the carbon adsorbant is activated charcoal.

14. The process of claim 10 in which 1-4 kg carbon adsorbant is used per kg nitroaromatics in the waste stream.

15. The process of claim 10 in which the aromatic hydrocarbon is benzene.

16. The process of claim 10 in which the aromatic hydrocarbon is toluene.

17. The process of claim 10 in which the adjusting of the pH of the alkaline aqueous waste stream and the oxidation of the nitrophenolics are performed simultaneously.

18. In a process for removing nitrophenolic and other nitroaromatic compounds from an aqueous alkaline waste stream generated in a process for the nitration of benzene or toluene by the mixed acid technique, the improvement which comprises
    (a) adjusting the pH of the aqueous alkaline waste stream containing nitroaromatic and nitrophenolic compounds to a range from about 2 to 4.5,
    (b) contacting the acidic aqueous stream with 8 to 20 moles hydrogen peroxide and 0.15-1 moles ferrous ion catalyst per mole nitrophenolic compounds under conditions to effect oxidation of substantially all of the nitrophenolic compounds,
    (c) adjusting the acidic, oxidized aqueous waste stream having a reduced nitrophenolic content to about pH $\geq 4$, and
    (d) thereafter contacting the aqueous waste stream with 1-4 kg activated carbon adsorbent/kg nitroaromatics, wherein essentially all of the remaining unoxidized nitrophenolics and all other nitroaromatics in the aqueous waste stream are removed in said contacting step.

19. The process of claim 18 in which steps (a) and (b) are performed simultaneously.

20. The process of claim 18 in which 10 to 15 moles hydrogen peroxide are used per mole nitrophenolic compound.

* * * * *